United States Patent
Tamekuni et al.

[11] Patent Number: 5,909,528
[45] Date of Patent: Jun. 1, 1999

[54] OPTICAL CONNECTOR AND ASSEMBLY METHOD THEREOF

[75] Inventors: Yoshikyo Tamekuni; Ichiro Matsuura; Kenichiro Otsuka, all of Yokohama, Japan

[73] Assignee: Sumitomo Electric Industries, Ltd., Osaka, Japan

[21] Appl. No.: 08/848,298

[22] Filed: Apr. 29, 1997

[51] Int. Cl.[6] .................................................. G02B 6/36
[52] U.S. Cl. ............................... 385/137; 385/83; 385/84
[58] Field of Search ................................ 385/86, 69, 87, 385/60, 62, 65, 66, 67, 68, 79, 81, 83, 84

[56] References Cited

U.S. PATENT DOCUMENTS

| | | | |
|---|---|---|---|
| 4,850,671 | 7/1989 | Finzel | 385/69 |
| 5,499,310 | 3/1996 | Ueda | 385/86 |
| 5,717,804 | 2/1998 | Pan et al. | 385/92 |

*Primary Examiner*—Hung N. Ngo
*Attorney, Agent, or Firm*—Smith, Gambrell & Russell; Beveridge, DeGrandi, Weilacher & Young Intellectual Property Group

[57] ABSTRACT

The present invention relates to an optical connector and assembly method thereof to provide easier, faster and more stable coupling characteristics without fusion connection nor end-face polishing procedures at job sites. The optical connector includes a ferrule formed of a cylindrical body having a channel along a center axis thereof, the ferrule intermediate section having a cut-away portion, the ferrule with a built-in optical fiber projecting into the cut-away portion; a support member existing within the cut-away portion for maintaining a contact section between the built-in optical fiber and the optical fiber inserted from the backward section; and a locking member for holding together the intermediate section and the support member from the outer periphery of the intermediate section.

18 Claims, 13 Drawing Sheets

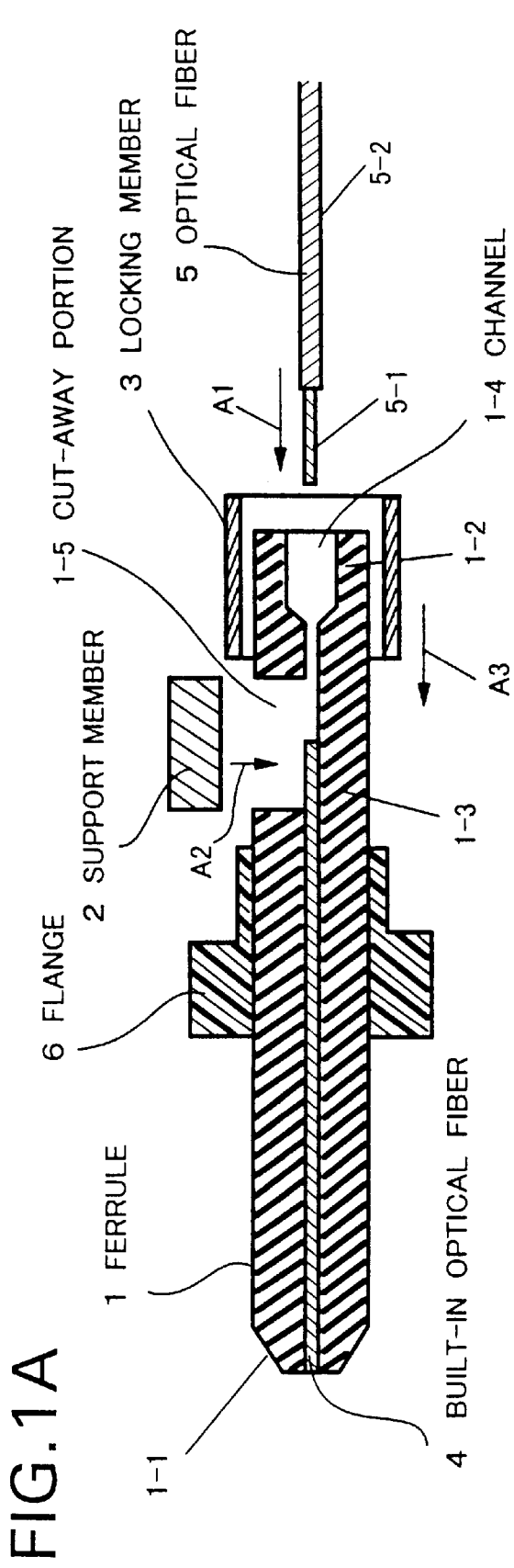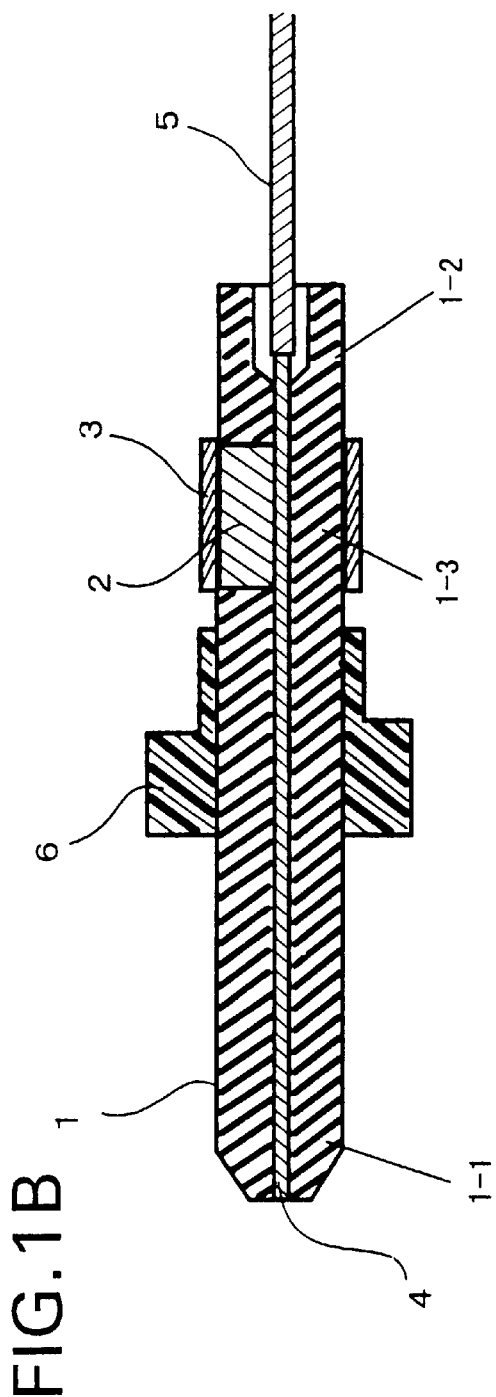

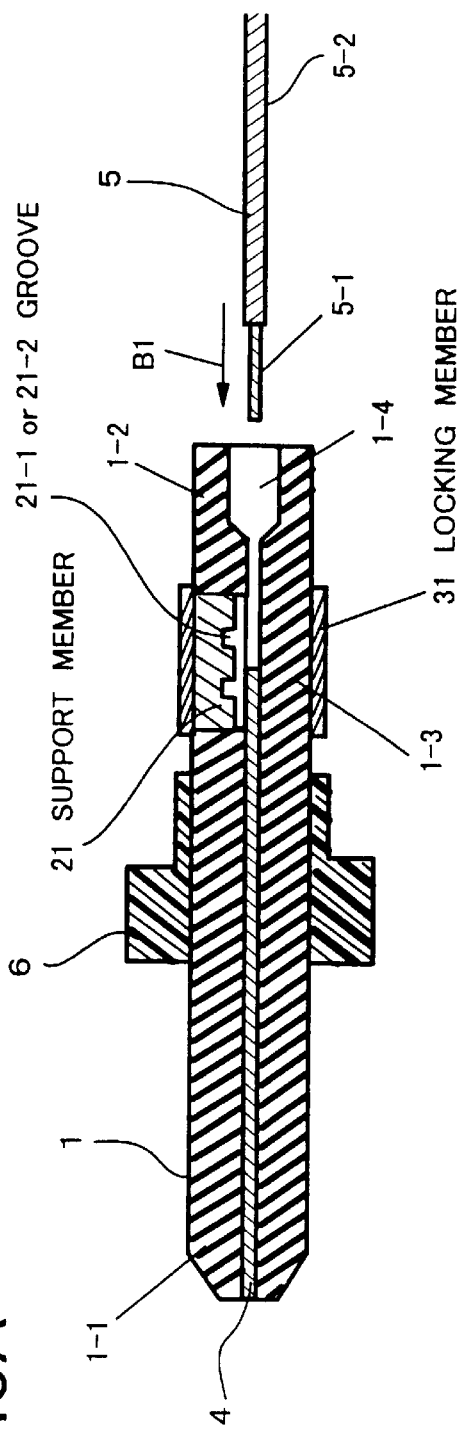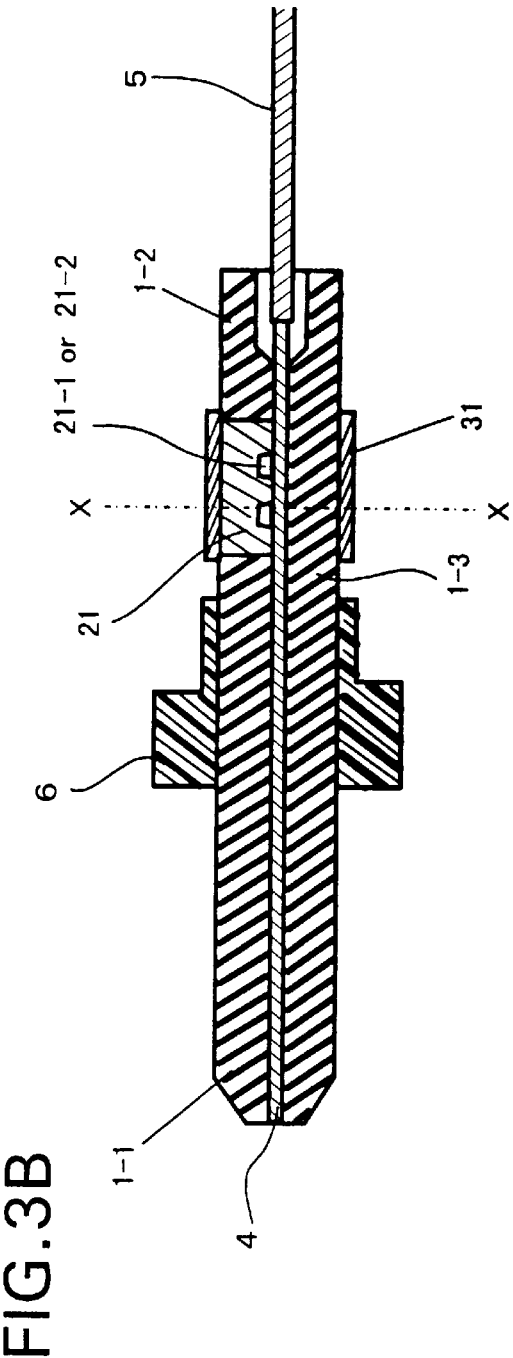

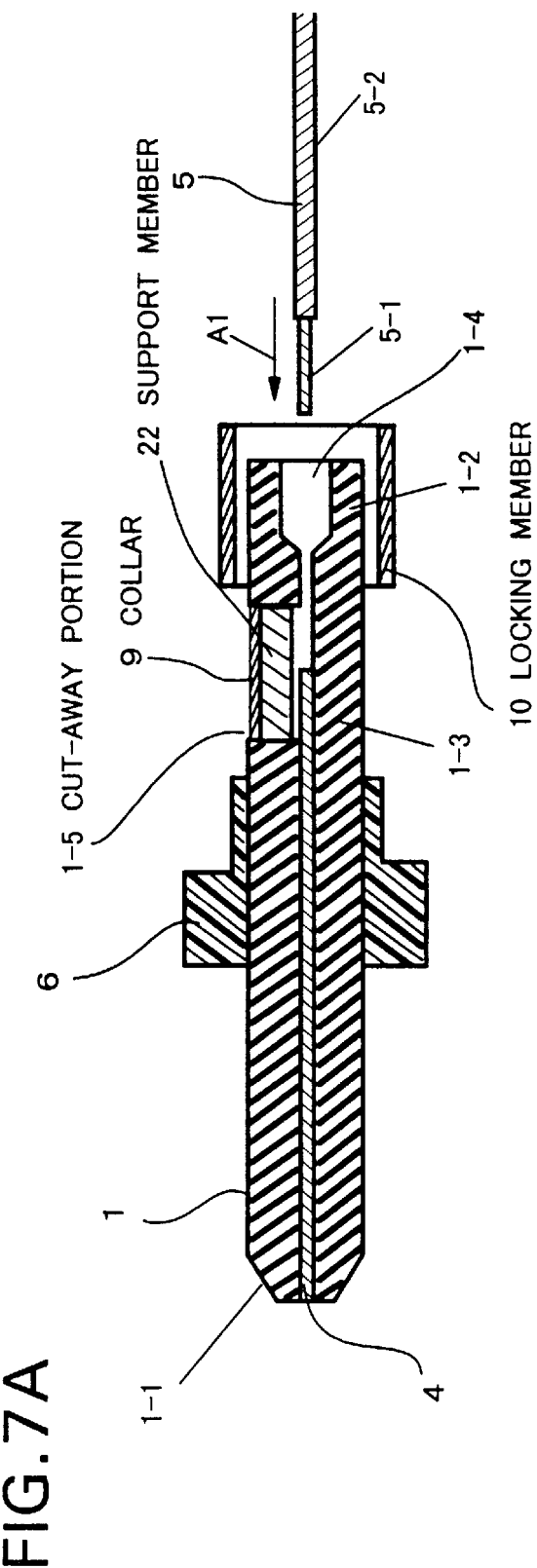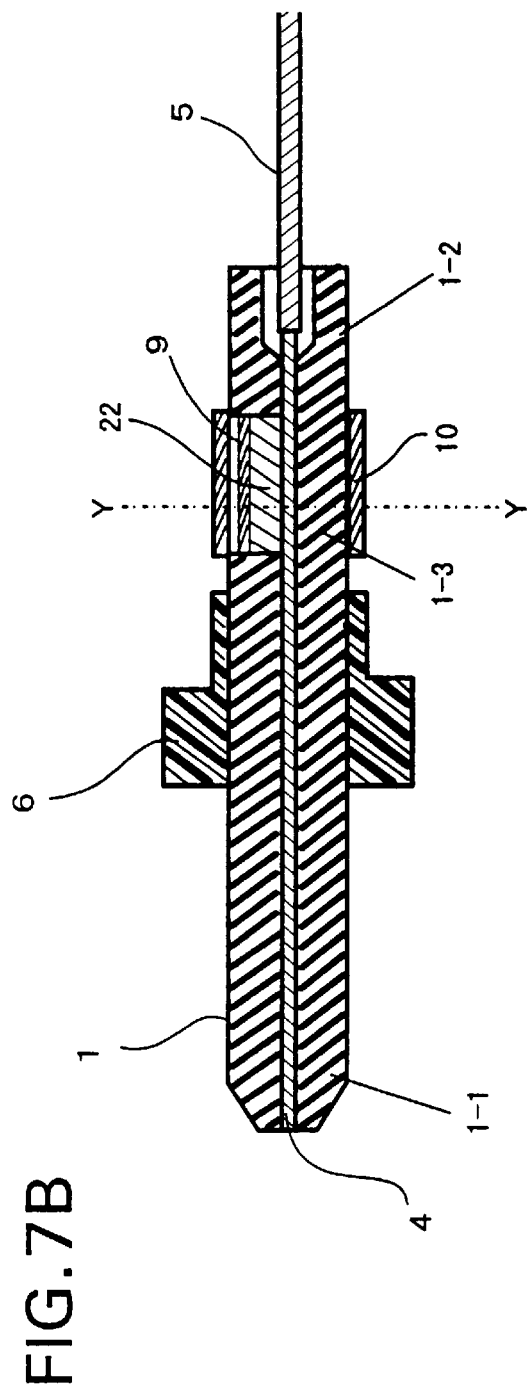
FIG.7A
FIG.7B 10-2 TAPERED GROOVE 10-1 GROOVE

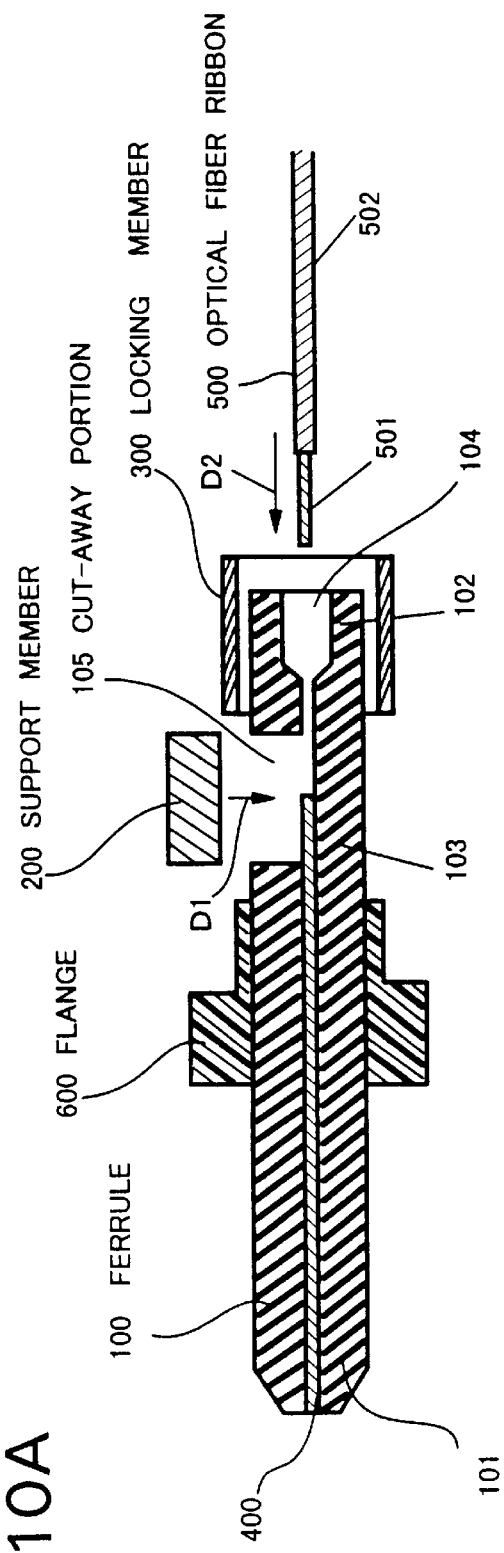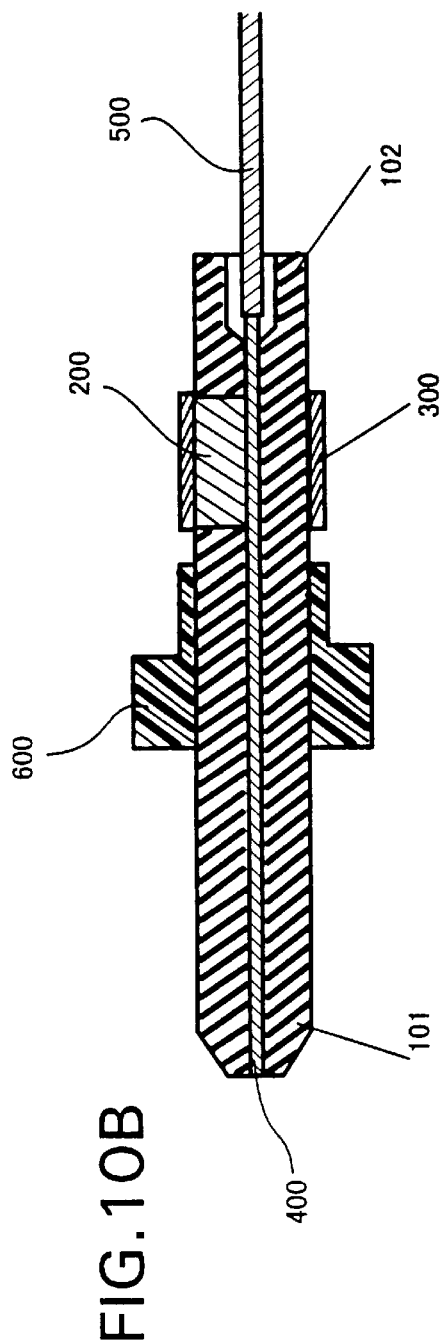
FIG. 10A
FIG. 10B

302 LOCKING MEMBER
201
103
400

302
201
400
103

OPTICAL CONNECTOR AND ASSEMBLY METHOD THEREOF

BACKGROUND OF THE INVENTION

1. Field of the Invention

The present invention relates to optical connectors for connection of optical fiber cables associated together or of an optical receiver/transmitter device or the like via one or more optical fibers, and an assembly method thereof.

2. Description of the Background Art

As optical communications are more widely used, it is becoming increasingly important to assemble optical connectors at cable-laying sites while reducing the complexity of assembly and shortening the time taken therefor.

Conventionally, in order to detach, couple or interconnect optical fiber cables or to connect optical receiver/transmitter devices via optical fibers, two methods are known which follow: a method employing optical connectors, and a method of making optical fibers to be in physical contact with each other through the use of V-groove parts. In view of workability and/or durability, the former approach is considered more preferable in most cases.

In cases where optical connectors are used for connection, at least two different approaches are available as follows: (1) using fusion splicing to connect an optical fiber pre-secured on the side of an optical connector with an associative optical fiber on the side of an optical cable; and (2) buckling the optical fiber on the optical cable side within the optical connector for joint interconnection at job sites (as disclosed in Japanese Utility-Model Registration Application No. 60-7605).

SUMMARY OF THE INVENTION

Problems to be Solved by the Invention

The first of the aforesaid prior known approaches might not be preferable in light of the fact that workability is decreased when the fusion splicing connection tasks are to be performed at construction sites. As for the second prior art approach, this necessarily requires the use of polishing machines for polishing connector terminal ends or of microscopic test apparatus, which in turn adversely serves to reduce workability at cable-laying sites while increasing the time required therefor. An attempt was made to provide an improved invention in this respect as disclosed, for example, in Published Unexamined Japanese Patent Application No. 6-337325; unfortunately, the invention disclosed therein suffers from a problem in that the coupling characteristics remain unstable, thereby decreasing reliability.

Accordingly, an object of the present invention is to provide an optical connector structure and an assembly method thereof capable of avoiding the foregoing problems encountered with the prior art, and that further requires none of the fusion connection or end-face polishing procedures.

Means for Solving the Problems

An optical connector in accordance with the present invention is specifically arranged to comprise: a ferrule having a channel penetrating through the center of each of a distal end section, an intermediate section, and a backward section of a cylindrical body, wherein the intermediate section is provided with a cut-away portion having a cross-section of a semicircle shape, an optical fiber that is to be pre-inserted into the channel at the distal end section, and that is also secured thereto with its inserted end being projected toward the intermediate section;

a support member at the cut-away portion provided at the intermediate section of the ferrule, for maintaining the end-face contact state between said built-in optical fiber and an optical fiber inserted from the channel of said backward section; and a locking member for securing together said intermediate section of the ferrule and the support member engaged with the cut-away portion from the outer periphery thereof.

Another optical connector in accordance with the present invention is provided which is featured by including a ferrule having a plurality of parallel channels extending through a distal end section, an intermediate section and a backward section of a rectangular body, wherein the intermediate section is provided with a cut-away portion extending across said channels, while a plurality of optical fibers are each inserted into the channel of the distal end section and are secured in advance thereto in such a manner that the built-in optical fibers reach the intermediate section for projection, a support member at the cut-away portion provided at the intermediate section of the ferrule, for retaining the end-face contact state between said built-in optical fibers and a plurality of optical fiber ribbons inserted from the channel of said backward section, and a locking member for tightly holding together the intermediate section of the ferrule and the support member engaged with the cut-away section from the outer periphery thereof.

A method of assembling an optical connector in accordance with the present invention is featured by comprising the steps of preparing the aforesaid ferrule, support member and locking member, causing an optical fiber to pass through the channel of the ferrule backward section to thereby make a built-in optical fiber disposed in the ferrule intermediate section and a penetrating optical fiber to be brought into physical contact with each other at the respective end faces thereof, and holding by the support member the built-in optical fiber disposed in the ferrule intermediate section and the penetrating optical fiber at or near the end faces thereof while causing them to be secured by the locking member.

[Function and Effect]

Through the use of the foregoing arrangement, the optical connector in accordance with the present invention is suitably applicable in particular to "in-situ" cable-laying jobs because of its capability of being assembled while only requiring only simple preparation, such as coating removal and surface processing at the ends of the optical fibers to be connected. Accordingly, it is possible to significantly shorten the work time as compared with the case of either fusion-connecting at construction sites or performing end-face polishing treatment. Further, since the built-in optical fiber in the optical connector and an optical fiber(s) to be coupled thereto are successfully secured together at or near the end faces thereof through the use of the support member, positional deviations will no longer take place at all at end-face locations, which deviations otherwise might occur due to application of tightening forces thereto, thereby enabling achievement of an optical connector capable of offering stable coupling characteristics as well as enhanced reliability.

BRIEF DESCRIPTION OF THE DRAWINGS

[FIGS. 1]

Figure 2A:
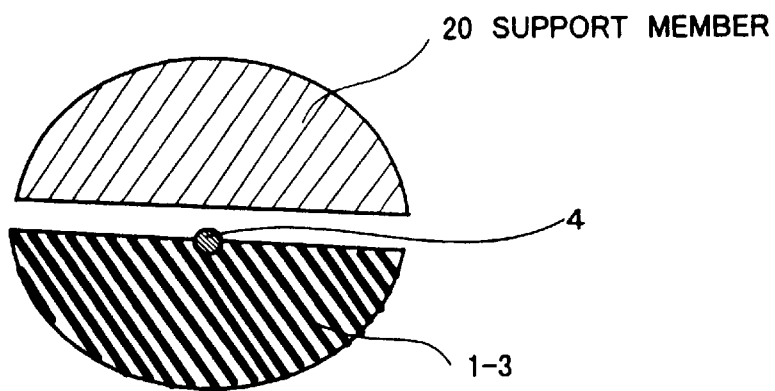

Longitudinal cross-sectional views showing a configuration of an optical connector in accordance with a first embodiment, wherein FIG. 1(a) of the same figure of the drawing shows the before-assembly state, whereas FIG. 1(b) thereof shows the after-assembly state.

[FIGS. 2]

Figure 2B:
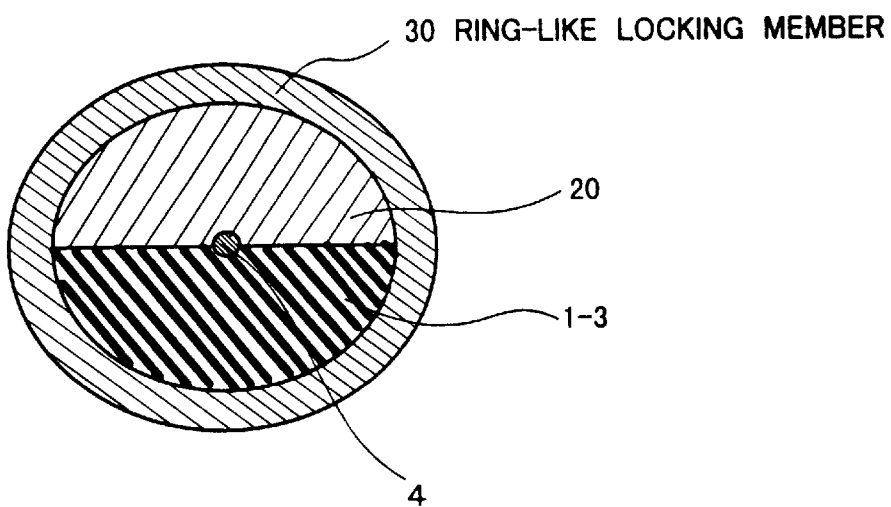

Lateral cross-sectional views at a ferrule intermediate section of FIGS. 1, wherein FIG. 2(a) of the drawing represents the state in which a support member is engaged with a cut-away portion, whereas FIGS. 2(b) and (c) represent the secured state using a locking member.

[FIGS. 3]

Longitudinal cross-sectional views showing a configuration of an optical connector in accordance with a second embodiment, wherein FIG. 3(a) of the drawing shows the before-assembly state, whereas FIG. 3(b) thereof shows the after-assembly state.

[FIGS. 4]

Figure 4A:
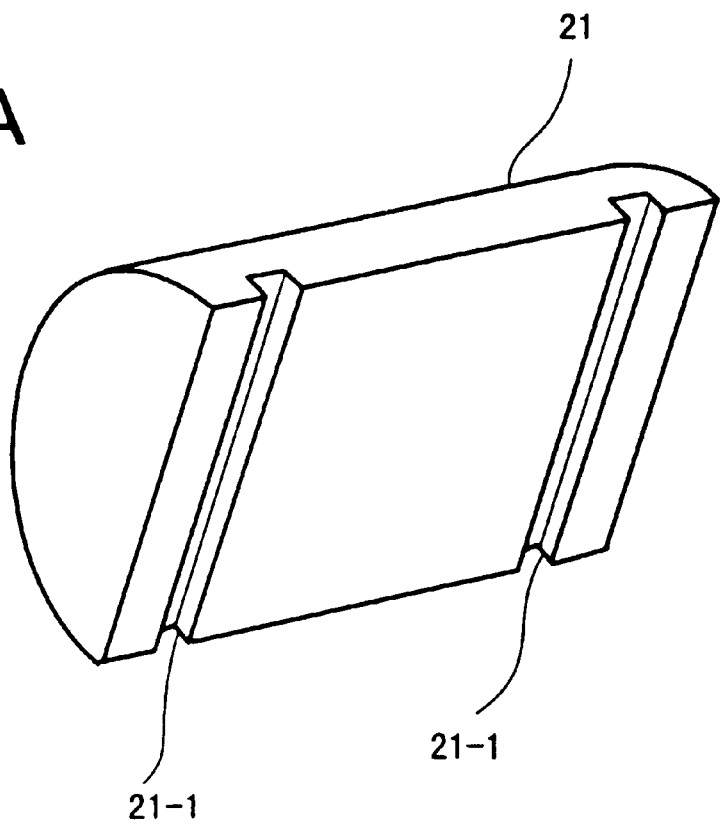

These are perspective views of the support member shown in FIGS. 3. FIG. 4(a) of the drawing shows one configuration with a groove penetrating the support member, whereas FIG. 3(b) shows another configuration with a groove that is prevented from reaching the center axis in the longitudinal direction of the support member.

[FIGS. 5]

Figure 5A:
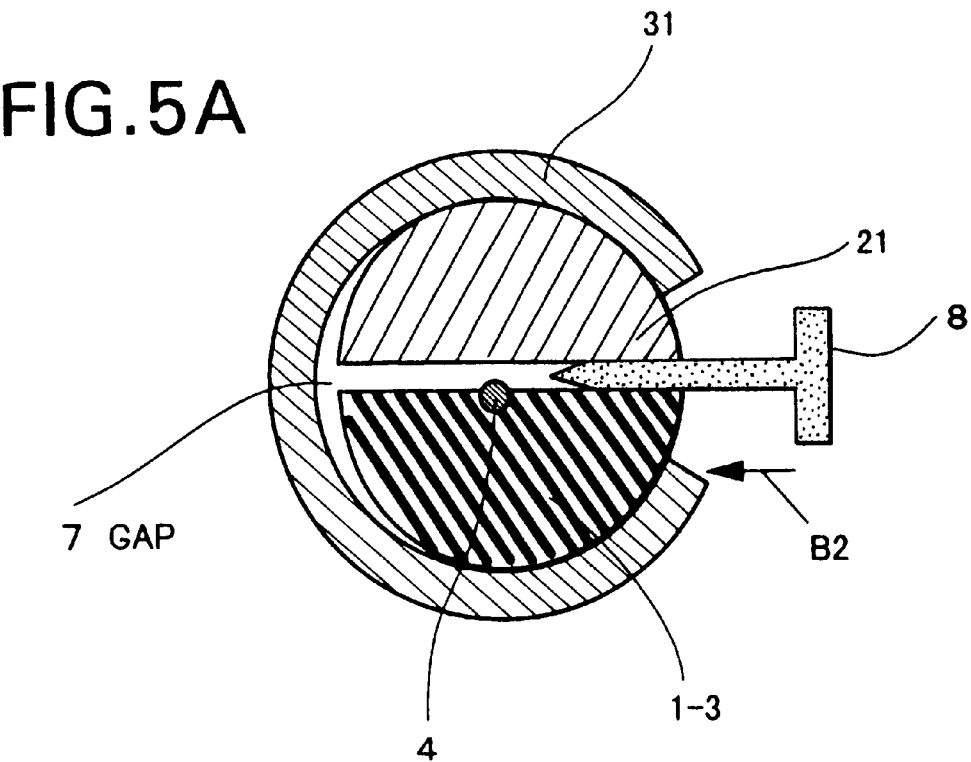
Figure 5B:
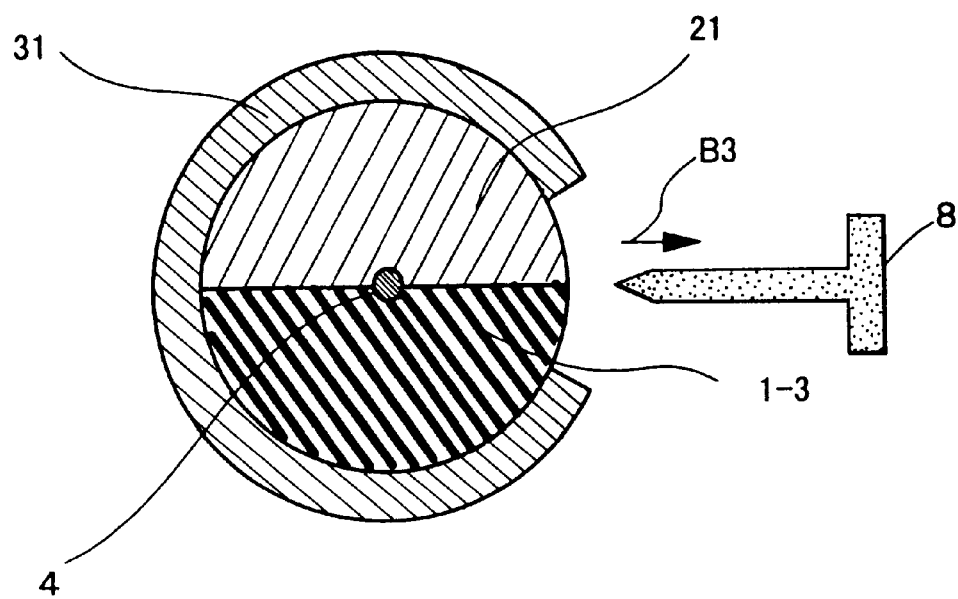

Cross-sectional views along line X—X of FIG. 3 in the case where the support member of FIG. 4(a) is used with insertion of jig 8 in FIG. 5(a) and removal of jig 8 in FIG. 5(b).

[FIGS. 6]

Figure 4B:
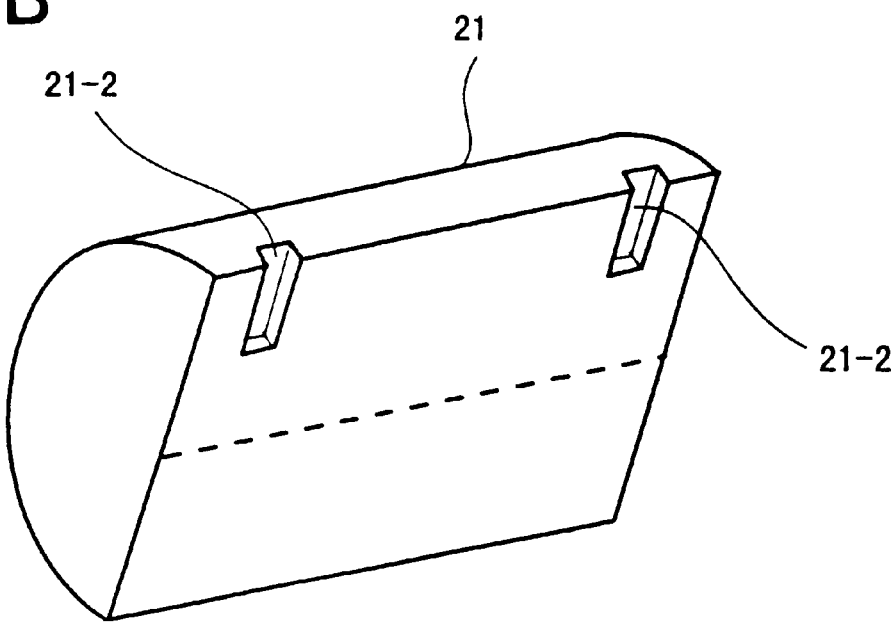
Figure 6A:
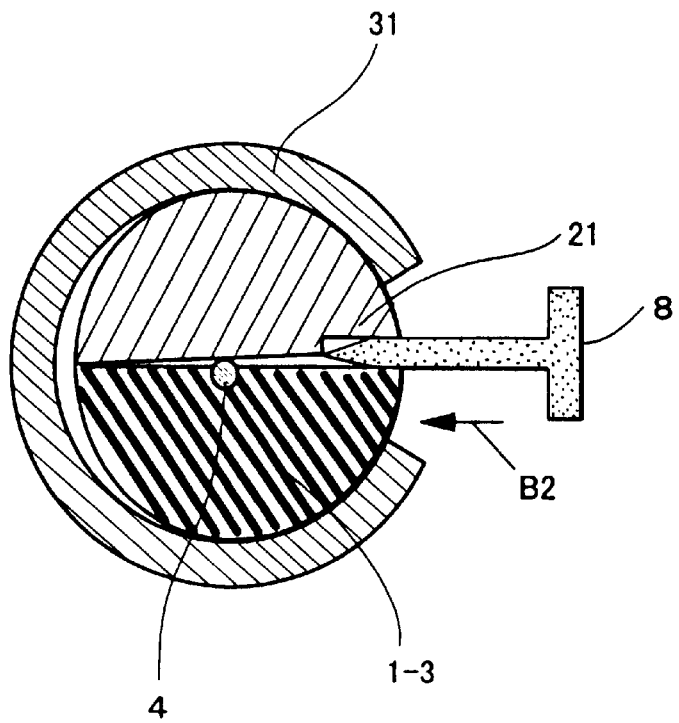
Figure 6B:
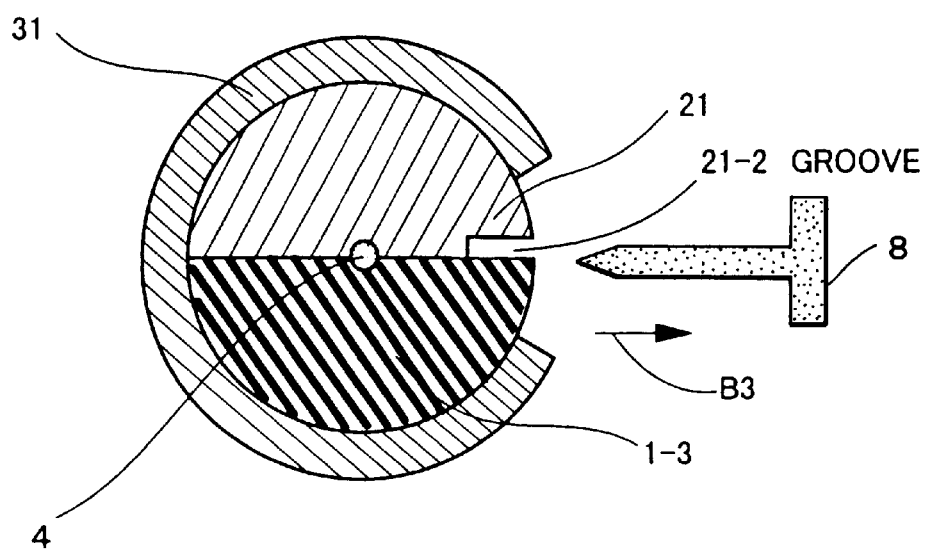

Cross-sectional views along line X—X of FIG. 3, in the case where the support member of FIG. 4(b) is used with insertion of jig 8 in FIG. 6(a) and removal of jig 8 in FIG. 6(b).

[FIGS. 7]

Longitudinal cross-sectional views showing a configuration of an optical connector in accordance with a third embodiment, wherein FIG. 7(a) of the drawing shows the before-assembly state, whereas FIG. 7(b) shows the after-assembly state.

[FIG. 8]

A Y—Y cross-sectional view of FIG. 7(b).

[FIGS. 9]

Figure 9A:
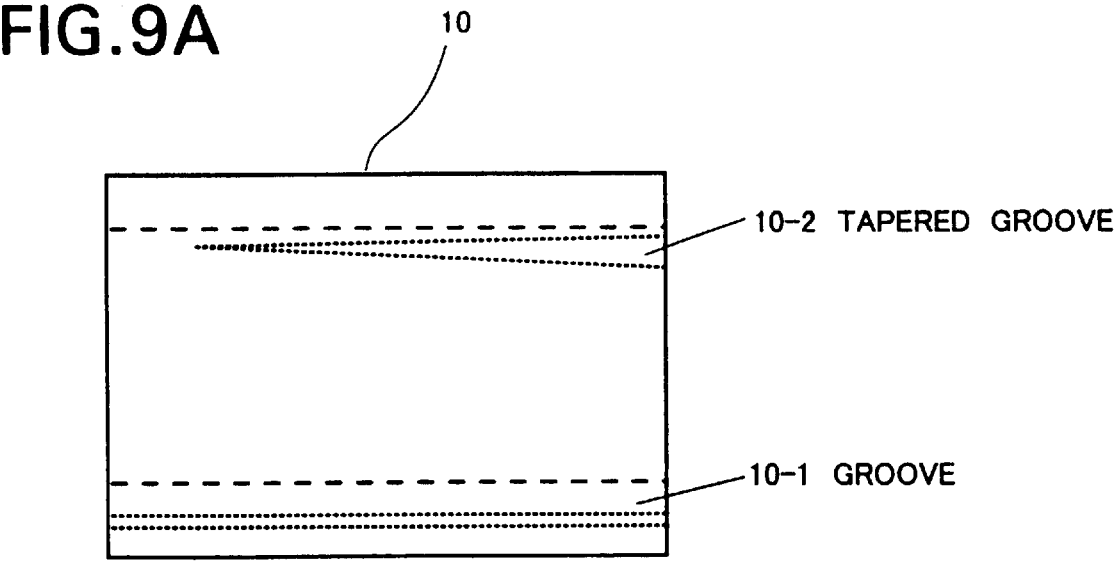
Figure 9B:
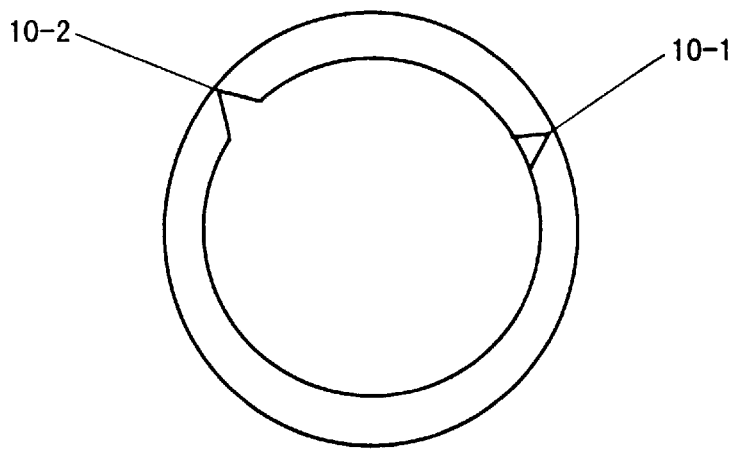

A detailed depiction of the locking member shown in FIGS. 7, wherein FIG. 9(a) of the same is a plan view, whereas FIG. 9(b) is a side view.

[FIGS. 10]

Longitudinal cross-sectional views showing a configuration of an optical connector in accordance with a fourth embodiment, wherein FIG. 10(a) of the drawing shows the before-assembly state, whereas FIG. 10(b) shows the after-assembly state.

[FIGS. 11]

Figure 11A:
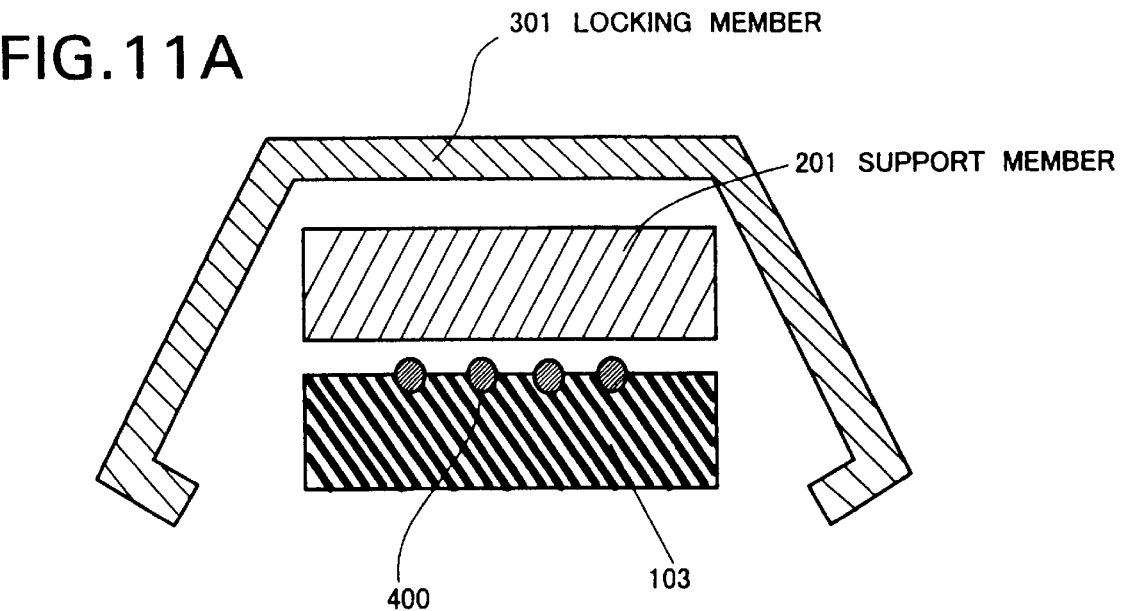
Figure 11B:
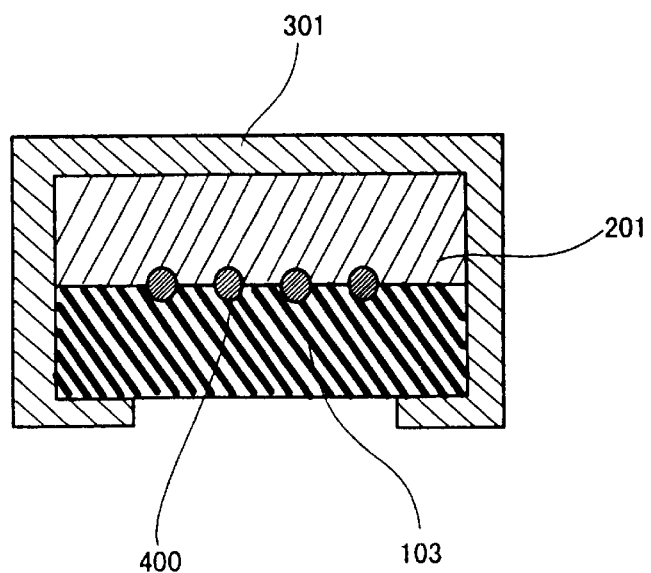

A lateral cross-sectional view of the ferrule intermediate section of FIGS. 10 employing a locking member that is arranged to clamp the support member and ferrule together from the upper sides thereof. FIG. 11(a) of the drawing shows the before-assembly state, whereas FIG. 11(b) shows the after-assembly state.

[FIGS. 12]

Figure 12A:
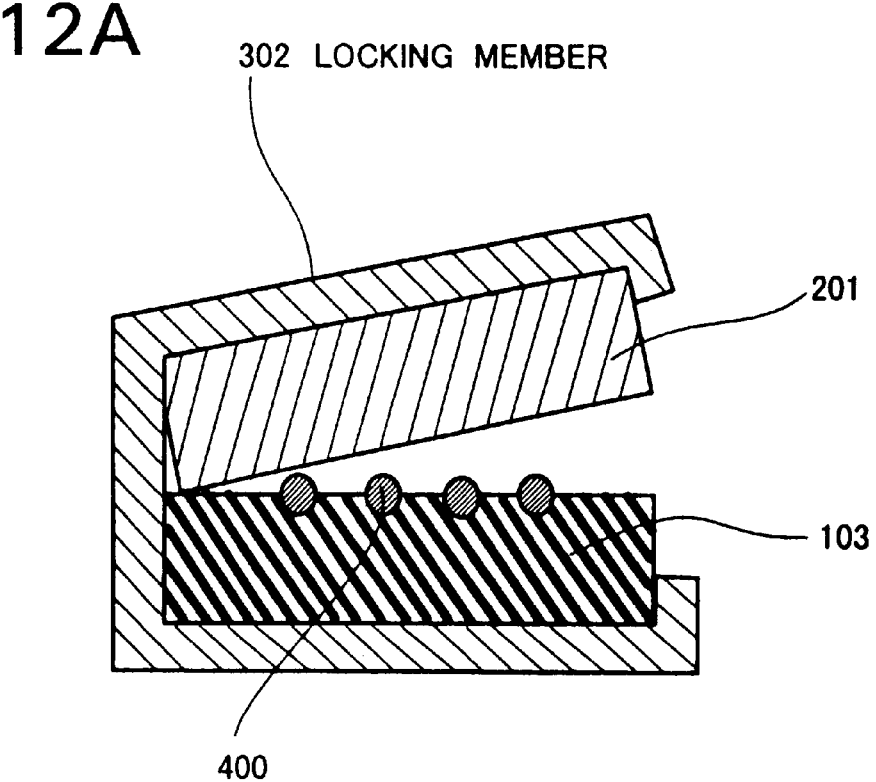
Figure 12B:
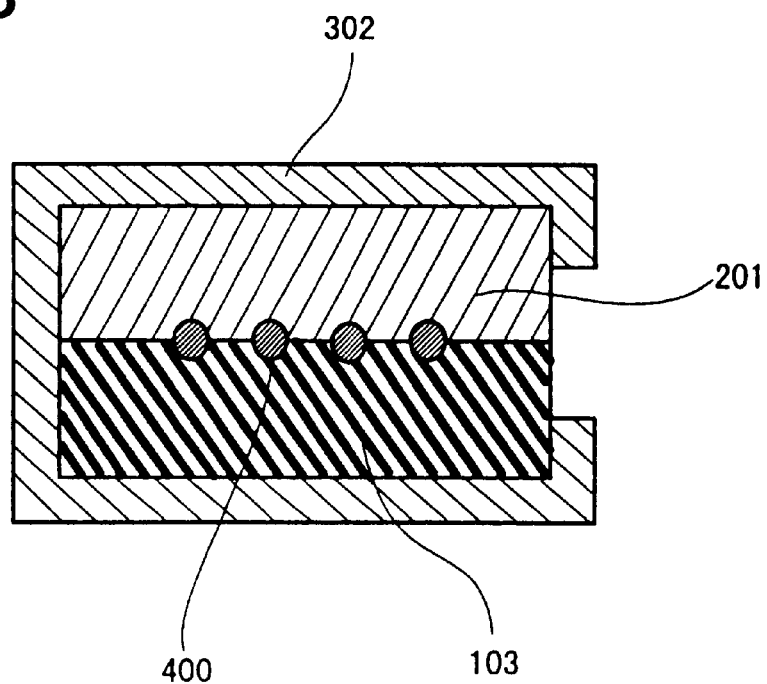

A lateral cross-sectional view of the ferrule intermediate section of FIGS. 10 employing a locking member for clamping the support member and ferrule together from the side walls thereof. FIG. 12(a) of the drawing shows the before-assembly state, whereas FIG. 12(b) shows the after-assembly state.

[FIG. 13]

A side view of the ferrule distal end section of FIGS. 10.

[FIG. 14]

A lateral cross-sectional view of the ferrule intermediate section of an optical connector in accordance with a fifth embodiment.

DESCRIPTION OF REFERENCE NUMERALS

1: ferrule
1-1: ferrule distal end
1-2: ferrule backward section
1-3: ferrule intermediate section
1-3-1: projecting portion
1-4: channel
1-5: cut-away portion
2: support member
20: support member
21: support member
21-1: groove
21-2: groove
22: support member
23: support member
3: locking member
30: ring-like locking member
31: open-type locking member
4: built-in optical fiber
5: optical fiber
5-1: glass fiber portion
5-2: fiber coating
6: flange
7: gap
8: adjustment jig
9: collar
9-1: latch
10: locking member
10-1: tapered groove
10-2: groove
100: ferrule
101: ferrule distal end section
102: ferrule backward section
103: ferrule intermediate section
104: channel
105: cut-away portion
200: support member
201: support member
300: locking member
301: locking member
302: locking member
400: built-in optical fiber
500: optical fiber ribbon
501: glass fiber portion
502: fiber coating
600: flange
700: guide-pin hole
A1, A2, A3, B1, B2, B3, C1, D1, D2: arrows

DESCRIPTION OF THE PREFERRED EMBODIMENTS

Several embodiments of the present invention will now be described hereafter with reference to the accompanying drawings. It should be noted that in the drawings, identical parts or components are identified by the same reference numerals, and any duplicate explanations will be omitted.

FIG. 1 is a longitudinal cross-sectional view showing a configuration of an optical connector in accordance with a first embodiment, wherein part (a) of this drawing shows the before-assembly state, whereas part (b) thereof shows the after-assembly state.

In FIG. 1, a columnar or cylindrical ferrule 1 has channel 1-4 penetrating through the center of each of a distal end section 1-1, an intermediate section 1-3, and backward section 1-2. The intermediate section 1-3 is provided with a cut-away portion 1-5 which is of a semicircle shape in cross-section. An optical fiber 4 is pre-inserted for fixation into the channel of the distal end section 1-1 so as to extend until it reaches the intermediate section 1-3 to project thereat.

The cut-away portion 1-5 is provided at the intermediate section 1-3 of the ferrule 1, and has a support member 2 and a locking member 3. The support member 2 is for causing the built-in optical fiber 4 to be brought into physical contact at its edges with an optical fiber 5 (arrow A1) as inserted from a channel 1-4 of the backward section, and for immovably holding these fibers by pushing them (arrow A2) onto a certain plane of the intermediate section 1-3 of the ferrule 1 which plane is on the side of the pressing optical fibers. The locking member 3 is slidable in the direction of arrow A3 for locking together the intermediate section 1-3 of the ferrule and the support member 2 engaged with the cut-away portion 1-5 from the outer peripheral surfaces thereof.

When necessary, the embodiment may be arranged such that a flange 6 is employed above the outer periphery between the distal end section 1-1 and the intermediate section 1-3 of the ferrule 1, for fixation of the position of the ferrule inside a housing (not shown) which externally covers or "wraps" the ferrule 1.

Figure 2C:
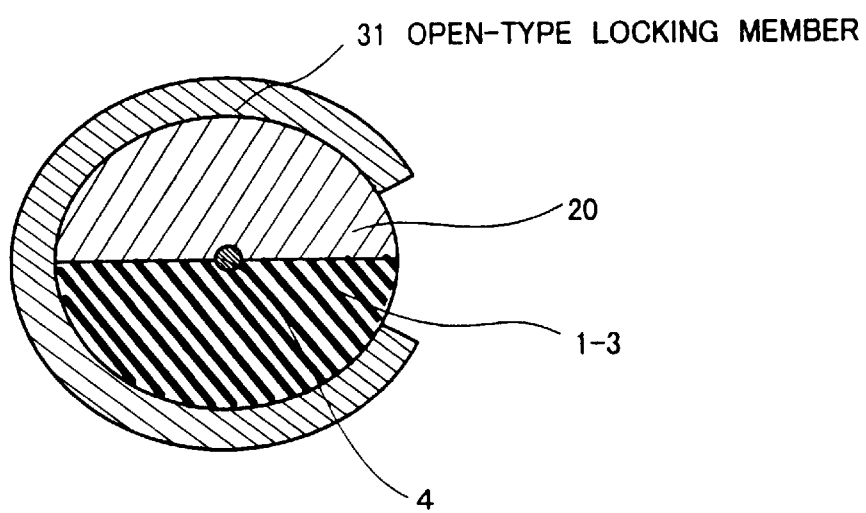

FIG. 2 is a lateral cross-sectional view at a ferrule intermediate section 1-3 of FIG. 1, wherein part (a) of the drawing represents the state in which a support member is engaged with a cut-away portion, whereas parts (b) and (c) represent the secured state using the locking member. In this drawing, the support member 2 is a support member 20 having a semicircular shaped cross-section that has substantially the same diameter as the ferrule, whereas the aforesaid locking member 3 is either a ring-like locking member 30 or an open-type locking member 31, each of which covers the outer periphery of the support member 20 and that of the ferrule intermediate section 1-3 in order to force them to be tightly pressed to each other for rigid fixation. When the support member 20 and the ferrule intermediate section 1-3 are clamped by the locking member 30 or 31, the built-in optical fiber 4 is embedded in the fiber pressing plane of the support member 20, resulting in almost the entire surface region thereof being in contact.

The optical fiber 4, which may be made of silicon glass or the like, is inserted into the channel provided at the center of the distal end section 1-1 of the ferrule 1, and it is then secured thereto with an adhesive. After the adhesive has sufficiently hardened, the end face on the side of the distal end of the ferrule 1 is polished to provide a mirror-like surface thereon. The inside end face of the built-in optical fiber 4 is also polished, providing a mirror surface whereby the coupling loss and the reflection of light rays are decreased. Note here that while a cut-out surface resulting from the stress concentration scheme remains sufficient for the inside end face, chamfer processing may be additionally performed with respect to the optical-fiber outer periphery when appropriate. Furthermore, for achievement of low joint loss and low reflection coupling, a matching agent with a certain refractivity may be pre-coated on the inside end faces of the built-in optical fiber and an optical fiber to be connected with the built-in optical fiber.

The contact section of the built-in optical fiber 4 and a glass fiber portion 5-1 of the optical fiber 5 is secured by cleaving the intermediate section 1-3 of the cylindrical ferrule 1 into a half-split shape, engaging the support member 2 with the resultant cut-away portion 1-5 thus formed, covering the outer periphery of the ferrule intermediate section 1-3 and that of the support member 2 with either the ring-like locking member 30 or the open-type locking member 31 made of spring steel or the like, and compressively holding the support member and ferrule together by the elastic force thereof, permitting fixation due to plastic deformation of the support member.

The cut-away portion 1-5 is formed by cutting techniques in the case where the ferrule 1 is made of ceramics or glass; alternatively, the same is formed by molding techniques where the ferrule is made of plastic materials.

Preferably, the support member 2 is made of aluminum of more than 99% purity, and that has excellent corrosion resistivity and processability. Further, in the case of plastics, there may be preferably employed liquid crystal polymer that has a lower coefficient of expansion, epoxy resin that has excellent thermal stability, or the like.

Next, a description will be given of an optical connector in accordance with a second embodiment of the invention.

FIG. 3 is a longitudinal cross-sectional view showing a configuration of this optical connector, wherein part (a) of the drawing shows the before-assembly state, whereas part (b) thereof shows the after-assembly state. FIG. 4(a) is an oblique-perspective drawing of the support member 21 shown in FIG. 3, and FIG. 5 is a cross-sectional drop of line X in FIG. 3.

The second embodiment is similar in basic configuration to the first embodiment, with an improvement being added thereto for achievement of more reliable fixation of an optical fiber to be coupled. Accordingly, the ferrule 1 is the same as that of the first embodiment in structure and materials; also, a support member 21 is identical in material to the support member 20.

As shown in FIG. 4, at least one groove 21-1 is provided in the fiber pressing plane of the support member 21 so as to extend at right angles to the axis direction of the ferrule. As shown in FIG. 5, the height of groove 21-1 is formed so that it is less than the outer diameter of an adjustment jig 8 by 0.07 to 0.10 mm; after the adjustment jig 8 is inserted along the direction of the arrow B2 into this groove 21-1, a gap 7 is made to enable insertion of the glass fiber portion 5-1 of the optical fiber 5 that is 125 μm in diameter into the intermediate section 1-3 of the ferrule.

Furthermore, improved examples of the groove(s) for the aforementioned adjustment jig may include several which are presently recognized to be equivalent to the best mode; such improved examples will be discussed below.

As shown in FIG. 4(b) and FIG. 6, while at least one groove for insertion of the adjustment jig 8 is provided on the support member 21 so as to extend in the direction perpendicular to the axis direction of the ferrule, this groove has a bottom which does not reach the contact section of the optical fiber, thereby forming a hole 21-2 for insertion of the adjustment jig 8.

As shown in FIG. 6(a), when the adjustment jig 8 is inserted into this hole 21-2, the ferrule intermediate section 1-3 and the support member 21 are forced to be partly spaced apart from each other in resistance to the elastic force applied thereto from the locking member 31, defining therebetween a certain vacant space into which the glass fiber portion 5-1 of the optical fiber 5 can be inserted. After insertion of the glass fiber portion 5-1 of the optical fiber 5 into the intermediate section 1-3 of the ferrule, pulling the adjustment jig 8 out may cause the support member 21 to return to the position of FIG. 6(b), due to the presence of the elastic force of the locking member 31, whereby the glass fiber portion 5-1 of the optical fiber 5 is immovably held at the optical fiber contact position.

Next, an assembly method of the optical connector in accordance with the second embodiment will be described.

(1) In plants or factories, after removal of the coat of the optical fiber 4, the clad section of the optical fiber is washed using an organic solution, and is then cut into a predefined length. Then, the resulting cut optical fiber is inserted into the channel of the ferrule, and is secured by adhesive thereto while permitting a certain length of one end portion of the optical fiber to project from the ferrule distal end section. Further, the projected end portion of the optical fiber from the ferrule distal end section is subjected to a polishing treatment for smoothing the end face thereof. As shown in FIG. 3(a), the support member 21 is engaged with the cut-away portion of the ferrule intermediate section 1-3; subsequently, the open-type locking member 31 is assembled to cover the outer periphery thereof.

(2) In jointing sites, after coating of the end portion of an optical fiber to be connected is removed, the optical fiber is cut into a specified length. Then follow these directions: insert the adjustment jig 8 into the groove 21-1 or 21-2; insert said optical fiber 5 into the channel 1-4 of the ferrule backward section 1-2 (arrow B1); and then, joint or splice together the built-in optical fiber 4 and optical fiber 5. Pulling the adjustment jig 8 out of groove 21-1 or 21-2 (arrow B3) causes the optical fiber 5 to be brought into contact with the built-in optical fiber 4, while simultaneously forcing it to be immovably attached to the ferrule intermediate section 1-3 due to elastic deformation of the locking member 3.

As can be seen from the foregoing, this optical connector renders in-situ assembly much easier than in the previous art, and is also easier to handle because all of the constituent parts—i.e. the ferrule 1, the support member 21, the open-type locking member 31, and the adjustment jig 8—are pre-assembled in factories into one integral structure, which is then stocked within the factory for later delivery when needed.

An optical connector in accordance with a third embodiment will now be described.

Figure 8:
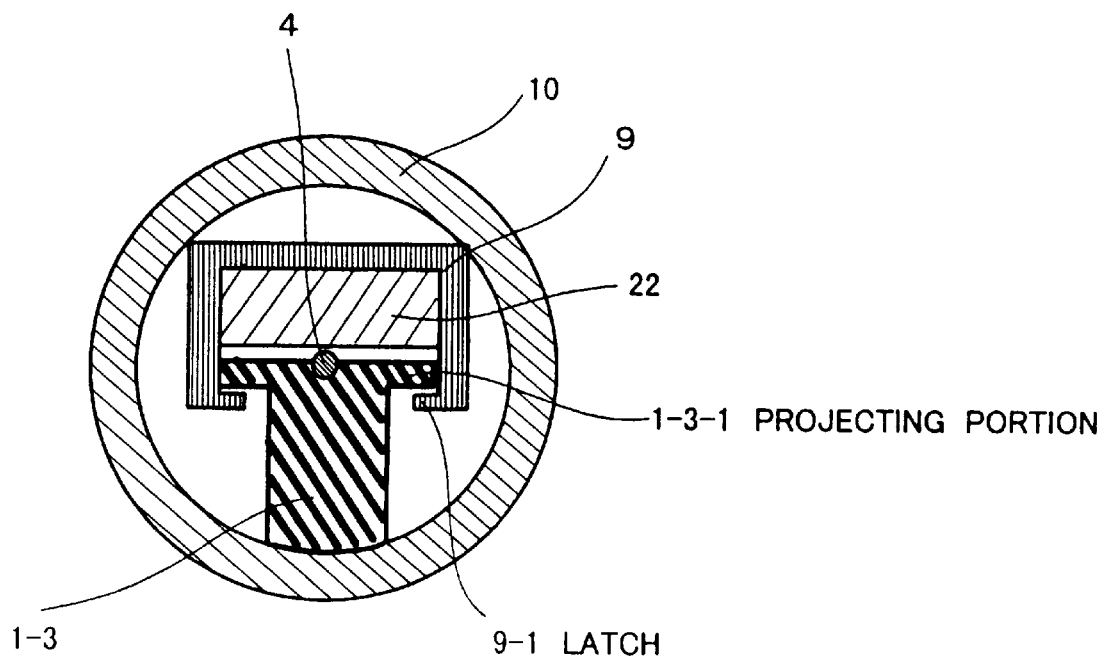

FIG. 7 is a longitudinal cross-sectional view of this optical connector, wherein part (a) of the drawing shows the before-assembly state, whereas (b) shows the after-assembly state. FIG. 8 is a cross-sectional drawing of Y—Y of FIG. 7, while FIG. 9(a) is a flat-plate drawing of the locking member of FIG. 7, and FIG. 9(b) is a lateral view of the locking member of FIG. 7.

The third embodiment is also similar in basic arrangement to the first embodiment, with some improvements being added thereto for insuring more reliable fixation of the optical fiber to be connected. Accordingly, the structure and material of the ferrule 1 is the same as those of the first embodiment; also, the material of a support member 22 is identical to that of the support member 20. It should be noted that differences therebetween are as follows: The locking member 10 is different in configuration from the locking member 30 or 31, and a collar 9 is newly added thereto.

More specifically, the arrangement of this optical connector is the same as that of the first embodiment, in that the cylindrical ferrule 1 has the channel 1-4 penetrating through the center of each of the distal end section 1-1, the intermediate section 1-3, and the backward section 1-2, that respectively, and the built-in optical fiber 4 is preinserted for fixation into the channel of the distal end section, and that the ferrule intermediate section 1-3 is provided with a cut-away portion of a semicircular cross-section; the optical connector features are such that it comes with a combination of a support member 22, a collar 9, a locking member 10.

Moreover, as shown in FIG. 8, the ferrule intermediate section 1-3 has at its edge a projecting portion 1-3-1 whereas the collar 9 is provided at each of both its ends with a nail-like latch 9-1 which covers the projecting portion 1-3-1. Since the latch covers the projecting portion, the collar 9 is normally prevented from being detached from the ferrule intermediate section 1-3. Further, the support member 22 is disposed between the collar 9 and the intermediate section 1-3 of the ferrule in such a way that these parts are integrally assembled together by adhesion or fusion-splicing fixation techniques. With such an arrangement, it is possible to substantially decrease the number of small component parts, thereby facilitating parts-stocking for supply and/or handling. The collar 9 is made of spring steel or an equivalent thereto; the support member 22 is preferably made of aluminum of more than 99% purity, and that has excellent corrosion resistivity and enhanced processability characteristics. Further, in the case where a plastic is used, it may be preferable to employ liquid crystal polymer with a lower expansion coefficient, epoxy resin with excellent thermal stability, or the like.

As shown in FIG. 9, the locking member 10 is provided with two parallel grooves on the internal surface of the cylindrical body, one of which is a uniform groove 10-1 of triangular cross-section, and the other of which is an axially tapered groove 10-2 of triangular cross-section. When assembling and securing the optical fiber 5, first move the locking member 10 to the position at the distal end section 1-1 of the ferrule; then, force the locking member 10 to slide up to the position of the intermediate section 1-3 of the ferrule, with the corner portions of the collar 9 being slid along the two grooves 10-1 and 10-2. At this time, one of such corner portions of the collar 9 works with the penetrating groove 10-1 side as a dead point, whereas, since the remaining groove 10-2 is gradually losing its taper, the collar 9 becomes compressed, thereby plastically deforming it to compress for fixation the optical fiber 5 via the support member 22. Note here that similar functions and advantages are attained even where both grooves 10-1 and 10-2 are tapered. The locking member 10 may preferably be made of stainless steel, which is robust and yet excellent in processability, as well as being less capable of deformation.

Next, an optical connector in accordance with a fourth embodiment will be described for simultaneously connecting a plurality of optical fibers together.

Figure 13:
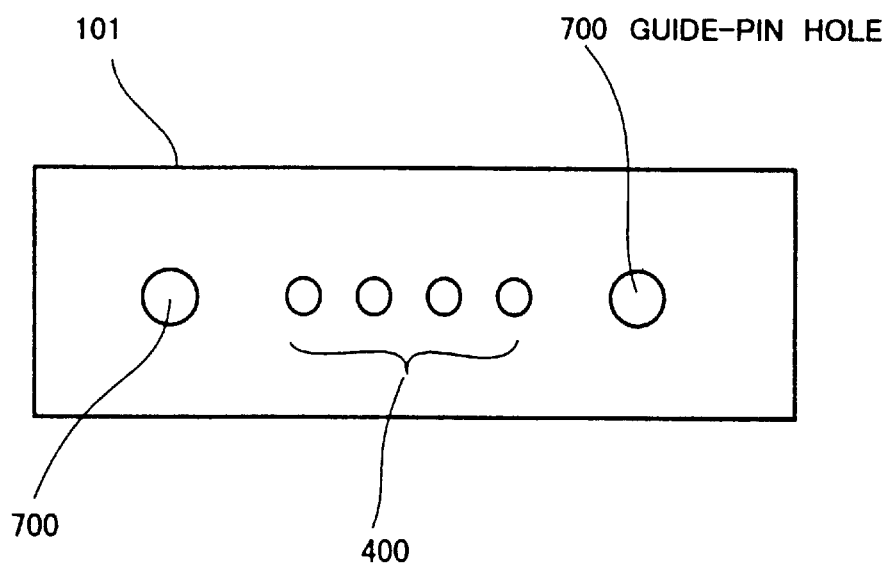

FIG. 10 is a longitudinal cross-sectional view of an optical connector in accordance with this embodiment, wherein part (a) of the drawing shows the before-assembly state, whereas part (b) thereof shows the after-assembly state. FIG. 11 is a lateral cross-sectional view showing an assembled state of this optical connector, wherein part (a) shows the state before a support member 201 and ferrule intermediate section 103 are secured together by a locking member 301, whereas (b) shows the after-fixation state thereof. In this case, the locking member 301 immovably holds the support member 201 and the ferrule intermediate section 103 in such a way as to clamp them from the upper direction thereof; alternatively, the locking member 301 may be modified so that it clamps the support member 201 and the ferrule intermediate section 103 from the horizontal direction. FIG. 13 is a side view of the end face of the distal end section 101 of the ferrule.

The fourth embodiment is substantially the same in basic configuration as the first embodiment, except that since plural optical fibers are to be interconnected, the ferrule 100, the support member 200, and the locking member 300 are of a rectangular shape in cross-section as shown in FIG. 11 and FIG. 12, respectively. Regarding the materials used, this embodiment is the same as the first embodiment.

As shown in FIG. 13, this optical connector is normally provided with guide-pin holes 700 at both sides on the end faces of the optical connector. This is to establish the accurate relative positions of two ferrules to be coupled.

Next, an optical connector in accordance with a fifth embodiment will be described.

Figure 14:
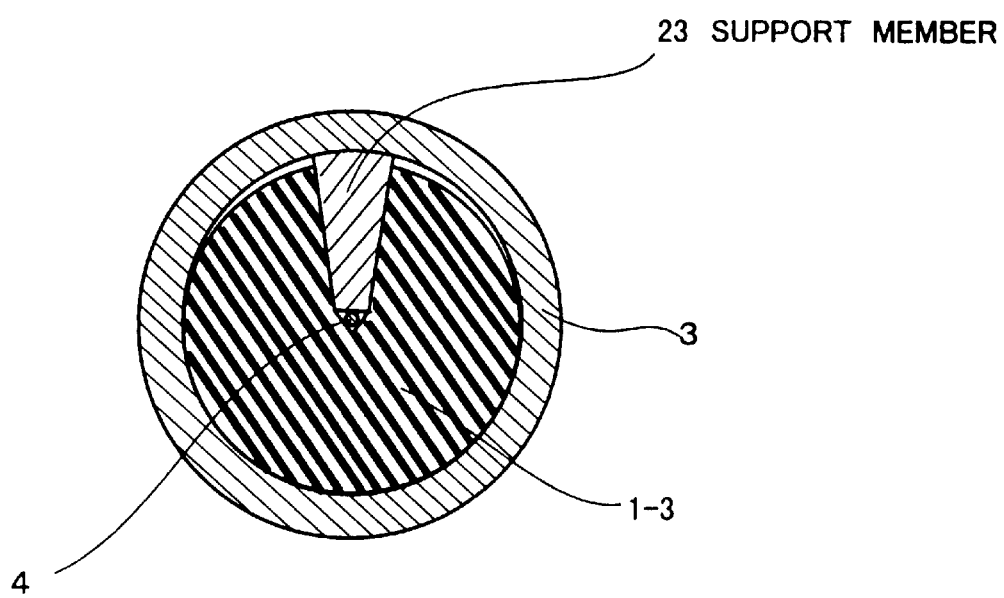

FIG. 14 is a lateral cross-sectional view near the ferrule intermediate section 1-3 in accordance with this embodiment. In regard to the remaining parts, that is, the distal end section 1-1, the backward section 1-2, and the locking member 3 of the ferrule, the structural arrangements thereof are the same as those in the first embodiment.

A configuration of the optical connector in accordance with this embodiment is as follows: In FIGS. 1 and 14, the optical connector is comprised of a ferrule having a channel penetrating through the centers of the ferrule distal end section 1-1, the intermediate section 1-3, and the backward section 1-2, wherein the ferrule intermediate section 1-3 is provided with a cut-away portion of a sector shape in cross-section for allowing the built-in optical fiber 4 to be preinserted for fixation into the channel of the ferrule distal end section 1-1, so that one end thereof projects up to the ferrule intermediate section 1-3; a support member 23 at the cut-away portion provided at the ferrule intermediate section 1-3 for holding and retaining said built-in optical fiber 4 and the optical fiber 5 as inserted from the channel 1-4 of said backward section with the end faces thereof being brought in contact with each other; and, a locking member 3 for immovably holding together the ferrule intermediate section 1-3 and the support member 23 engaged with the cut-away section from the outer peripheries thereof, wherein contact between the built-in optical fiber 4 and optical fiber 5 is attained by holding and securing a to-be-connected optical fiber at locations near the end face thereof.

By providing the ferrule intermediate section 1-3 with the sector-shaped cut-away portion while providing the support member 23 engageable with this cut-away portion in the manner described above, it becomes possible to more reliably hold and secure a nearby portion of the end face of the optical fiber. If the groove formed at the ferrule intermediate section is designed to resemble a letter "V" in shape, then more accurate contact-coupling may be performed.

A method of assembling the optical connectors of the first to fifth embodiments is featured by including the steps of (1) first preparing the ferrule, support member and locking member as previously explained in each said embodiment, (2) causing an optical fiber to pass through the channel of the ferrule backward section, thereby letting a built-in optical fiber and an optical fiber mate together to make physical contact with each other at the end faces thereof, and (3) holding by the support member the built-in optical fiber disposed in the ferrule intermediate section and the optical fiber at or near the end faces thereof, while at the same time causing them to be secured by the locking member.

As a practical structure, in addition to the rigid holding of the contact end-face nearby portions of the built-in optical fiber 4 and the optical fiber 5, fixation (not shown) is also made between the coated portion of the optical fiber 5 and the ferrule 1, thus preventing interruption due to vibrations.

We claim:

1. An optical connector for use in connecting optical fiber cables or connecting an optical receiver/transmitter device or the like via an optical fiber, said optical connector comprising:

a ferrule formed of a body having a distal end section, an intermediate section and a backward section, said body having a channel penetrating along a center axis thereof, said intermediate section provided with a cut-away portion coupled with said channel, said cut-away portion having its center axis aligned with the center axis of said body and is either a semicircle or a sector form in cross-section;

at least one optical fiber inserted into said ferrule for fixation so as to pass through the channel at said distal end section for projecting into said cut-away portion at said intermediate section, said optical fiber having a polished end face;

a support member existing within said cut-away portion for maintaining a contact section between the end face of the built-in optical fiber projecting into said cut-away portion and an end face of the optical fiber passing through a channel at said backward section; and a locking member for immovably holding together said intermediate section and said support member therein from the outer periphery of said intermediate section.

2. An optical connector as claimed in claim 1, wherein the support member is of a semicircular shape in cross-section that has substantially the same diameter as the ferrule.

3. An optical connector as claimed in claim 2, wherein said locking member is either a ring-like locking member or an open-type locking member with part of a ring being cut away, for entirely covering outer periphery of said support member and that of the ferrule intermediate section, thereby causing them to be integrally clamped together.

4. An optical connector as claimed in claim 1, wherein said support member is of a semicircular shape in cross-section that has substantially the same diameter as the ferrule, that said support member has a fiber pressing surface with at least a groove being provided therein to extend at right angles to the axis direction of the ferrule, and that an adjustment jig is provided to be removably inserted into said groove for adjustment of a gap between said supporting member and said ferrule intermediate section.

5. An optical connector as claimed in claim 4, wherein said locking member is an open-type locking member of a partially cut-away ring-like shape, for entirely covering the outer periphery of said support member and that of the ferrule intermediate section, thereby causing them to be integrally clamped together.

6. An optical connector as claimed in claim 1, wherein said support member is of a planar plate shape and is provided with a rectangular collar that is provided so as to wrap said support member and said ferrule intermediate section from the outer periphery thereof.

7. An optical connector as claimed in claim 6, further comprising it has a locking member covering said collar and the outer periphery of said ferrule intermediate section, such locking member resembling in shape a cylinder slidably provided in the axis direction, and having a tapered groove inside its cylinder shape, and such that it locks together the support member and the ferrule intermediate section by axially sliding to clamp said collar.

8. An optical connector as claimed in claim 6, wherein said support member is secured by adhesion or fusion onto an inner surface of said collar.

9. An optical connector as claimed in claim 6, further comprising it has a projecting portion at the intermediate section of said ferrule, and in that latches are provided at both edges of said collar covering said projecting portion.

10. A method of assembling an optical connecter comprising the steps of:

preparing the ferrule, support member and locking member as claimed in claim 1;

causing an optical fiber to pass through a channel of the ferrule backward section to thereby enable a built-in optical fiber disposed in the ferrule intermediate section and a penetrating optical fiber to be mated together and make physical contact with each other at the end faces thereof; and holding by the support member the built-in optical fiber disposed in the ferrule intermediate section and the penetrating optical fiber at the end faces thereof, while causing them to be secured by the locking member.

11. An optical connector as claimed in claim 1, wherein said ferrule, said support member and said locking member are separate parts.

12. An optical connector for use in connecting optical fiber cables or connecting an optical receiver/transmitter device or the like via an optical fiber, said optical connecter comprising:

a ferrule formed of a rectangular body having a distal end section, an intermediate section and a backward section, said rectangular body having a plurality of parallel channels penetrating said rectangular body in an axial direction thereof, said intermediate section provided with a cut-away portion coupled to said channels;

a plurality of optical fibers inserted into said ferrule for fixation into the channels at said distal end section so as to pass therethrough such that they project toward said cut-away portion at said intermediate section, each of said optical fibers having a polished end face;

a support member existing within said cut-away portion for supporting a contact section between each end face of said plurality of built-in optical fibers projecting into said cut-away portion and each end face of optical fibers passing through channels at said backward section; and a locking member for immovably holding together said intermediate section and said support member therein from the outer periphery of said intermediate section.

13. An optical connector as claimed in claim 12, wherein said support member is of a rectangular shape in cross-section, and either a rectangular-shaped locking member or an open-type locking member is provided so as to wrap said support member and the ferrule intermediate section from the outer periphery thereof.

14. An optical connector as claimed in claim 12, wherein said support member is of a rectangular shape in cross-section, that said support member has on a fiber pressing plane thereof a groove extending in a direction perpendicular to the axis direction of said ferrule, and that an adjustment jig is provided such that it is removably inserted into the groove for adjustment to a specified gap between the support member and the ferrule intermediate section.

15. An optical connector as claimed in claim 12, wherein said ferrule having a guide-pin hole is provided on an edge face of the distal end section for the positional alignment of two ferrules to be connected.

16. An optical connector as claimed in claim 12, wherein said ferrule, said support member and said locking member are separate parts.

17. An optical connector for use in connecting optical fiber cables or connecting an optical receiver/transmitter device or the like via an optical fiber, said optical connector comprising:

a ferrule having a channel penetrating through a cylindrical body including a distal end section, an intermediate section and a backward section, said cylindrical body having at said intermediate section a cut-away portion of a sector shape in cross-section coupled with said channel and having a center axis identical to a center axis of said cylindrical body;

an optical fiber inserted into said ferrule for fixation into the channel at said distal end section so as to pass therethrough and project into said cut-away portion at said intermediate section, said optical fiber having a polished end face;

a support member provided within said cut-away portion for retaining a contact section between the end face of said built-in optical fiber projecting toward said cut-away portion and an end face of an optical fiber passing through a channel at said backward section; and a locking member for immovably holding together said intermediate section and said support member therein from the outer periphery of said intermediate section.

18. An optical connector as claimed in claim 17, wherein said ferrule, said support member and said locking member are separate parts.

* * * * *